United States Patent
Li et al.

(10) Patent No.: US 9,336,128 B2
(45) Date of Patent: May 10, 2016

(54) METHOD AND SYSTEM FOR CODE ANALYSIS USING SYMBOLIC TYPES

(71) Applicant: Oracle International Corporation, Redwood Shores, CA (US)

(72) Inventors: Lian Li, Carindale (AU); Andrew Santosa, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/222,490

(22) Filed: Mar. 21, 2014

(65) Prior Publication Data

US 2015/0269061 A1 Sep. 24, 2015

(51) Int. Cl.
*G06F 9/44* (2006.01)
*G06F 11/36* (2006.01)

(52) U.S. Cl.
CPC .............. *G06F 11/3692* (2013.01); *G06F 8/00* (2013.01); *G06F 11/3608* (2013.01); *G06F 11/3684* (2013.01)

(58) Field of Classification Search
None
See application file for complete search history.

(56) References Cited

U.S. PATENT DOCUMENTS

| | | | | |
|---|---|---|---|---|
| 6,014,518 | A * | 1/2000 | Steensgaard | 717/154 |
| 2005/0188270 | A1* | 8/2005 | Dollin et al. | 714/38 |
| 2008/0082969 | A1* | 4/2008 | Agha et al. | 717/130 |
| 2011/0307864 | A1* | 12/2011 | Grechanik et al. | 717/124 |
| 2012/0311535 | A1* | 12/2012 | Fanning et al. | 717/123 |
| 2013/0326485 | A1* | 12/2013 | Ghosh | G06F 8/313 |
| | | | | 717/126 |
| 2014/0082594 | A1* | 3/2014 | Li et al. | 717/126 |
| 2014/0282419 | A1* | 9/2014 | Yoshida et al. | 717/126 |

OTHER PUBLICATIONS

Anand, S., Pasareanu, C.S., and Visser, W; "JPF-SE: a symbolic execution extension to java pathfinder;" Tools and Algorithms for the Construction and Analysis of Systems, Mar. 24, 2007 (4 pages).

Bucur, S., Ureche, V., Zamfir, C., and Candea, G.; "Parallel symbolic execution for automated real-world software testing;" In proceedings of the sixth conference on Computer systems, EuroSys '11, Apr. 10, 2011 (15 pages).

Cadar, C., Dunbar, D., and Engler, D.R.; "Klee: Unassisted and automatic generation of high-coverage tests for complex systems programs;" Proceedings of the 8th USENIX conference on Operating systems design and implementation, Dec. 8, 2008 (14 pages).

(Continued)

*Primary Examiner* — Li B Zhen
*Assistant Examiner* — Joanne Macasiano
(74) *Attorney, Agent, or Firm* — Osha Liang LLP

(57) ABSTRACT

A method for code analysis includes generating, by a computer processor, an execution path through software code. Generating the execution path includes adding, for an object having an undefined class, a first symbolic type constraint to a path condition of the first execution path based on a first statement in the execution path, and adding, for the object having the undefined class, a second symbolic type constraint to the path condition of the execution path based on a second statement in the first execution path. The method further includes the computer processor making a determination that the path condition of the execution path is infeasible based on the first symbolic type constraint of the object being inconsistent with the second symbolic type constraint of the object, and discarding the execution path based on the determination.

15 Claims, 6 Drawing Sheets

(56) References Cited

OTHER PUBLICATIONS

Chipounov, V., Kuznetsov, V. and Candea, G.; "S2e: a platform for in-vivo multi-path analysis of software systems;" In Proceedings of the sixteenth international conference on Architectural support for programming languages and operating systems; Mar. 5, 2011 (14 pages).

Godefroid, P., Klarlund, N. and Sen, K.; "DART: directed automated random testing;" In Proceedings of the 2005 ACM SIGPLAN conference on Programming language design and implementation, Jun. 12, 2005 (11 pages).

Godefroid, P., Levin, M.Y. and Molnar, D.A.; "Automated whitebox fuzz testing;" Proceedings of the Network and Distributed System Security Symposium, Feb. 10, 2008 (16 pages).

Sen, K., Marinov, D. and Agha, G; "Cute: a concolic unit testing engine for C;" ESEC/FSE 2005, Sep. 5, 2005 (10 pages).

* cited by examiner

METHOD AND SYSTEM FOR CODE ANALYSIS USING SYMBOLIC TYPES

BACKGROUND

Software testing is used to improve the quality of software. The basic technique is by defining a set of inputs to the program, called the test case. Each input in the test case defines concrete variable values. The test case is executed by the software to identify defects in the software. Multiple test cases may be defined to create a test set. For example, test cases may have mutations of variable values from other test cases in the test set. The coverage level of a test set is the number of different instructions executed in the software having a variety of inputs. In general, the greater the coverage level, the more likely that any and most defects are found in the software. In other words, a high-coverage test set includes a variety of inputs that causes a large proportion of the software under test to be executed.

SUMMARY

In general, in one aspect, embodiments relate to a method for code analysis, including generating, by a computer processor, an execution path through software code. Generating the execution path includes adding, for an object having an undefined class, a first symbolic type constraint to a path condition of the first execution path based on a first statement in the execution path, and adding, for the object having the undefined class, a second symbolic type constraint to the path condition of the execution path based on a second statement in the first execution path. The method further includes the computer processor making a determination that the path condition of the execution path is infeasible based on the first symbolic type constraint of the object being inconsistent with the second symbolic type constraint of the object, and discarding the execution path based on the determination.

In general, in one aspect, embodiments relate to a system for code analysis including a computer processor, a data repository for storing software code and symbolic type rules, and a debugger executing on the computer processor. The debugger includes a symbolic type analysis engine including a symbolic type path analyzer for generating an execution path through software code. Generating the execution path includes adding, for an object having an undefined class, a first symbolic type constraint to a path condition of the execution path based on a first statement in the first execution path, and adding, for the object having the undefined class, a second symbolic type constraint to the path condition of the execution path based on a second statement in the execution path. The symbolic type analysis engine further includes a constraint solver for making a determination that the path condition of the execution path is infeasible based on the first symbolic type constraint of the object being inconsistent with the second symbolic type constraint of the object, and discarding the execution path based on the determination.

In general, in one aspect, embodiments relate to a non-transitory computer readable medium for code analysis, including instructions for generating an execution path through software code. Generating the execution path includes adding, for an object having an undefined class, a first symbolic type constraint to a path condition of the execution path based on a first statement in the execution path, and adding, for the object having the undefined class, a second symbolic type constraint to the path condition of the execution path based on a second statement in the execution path. The instructions are further for making a determination that the path condition of the execution path is infeasible based on the first symbolic type constraint of the object being inconsistent with the second symbolic type constraint of the object, and discarding the execution path based on the determination.

Other aspects of the invention will be apparent from the following description and the appended claims.

DETAILED DESCRIPTION

Figure 1:
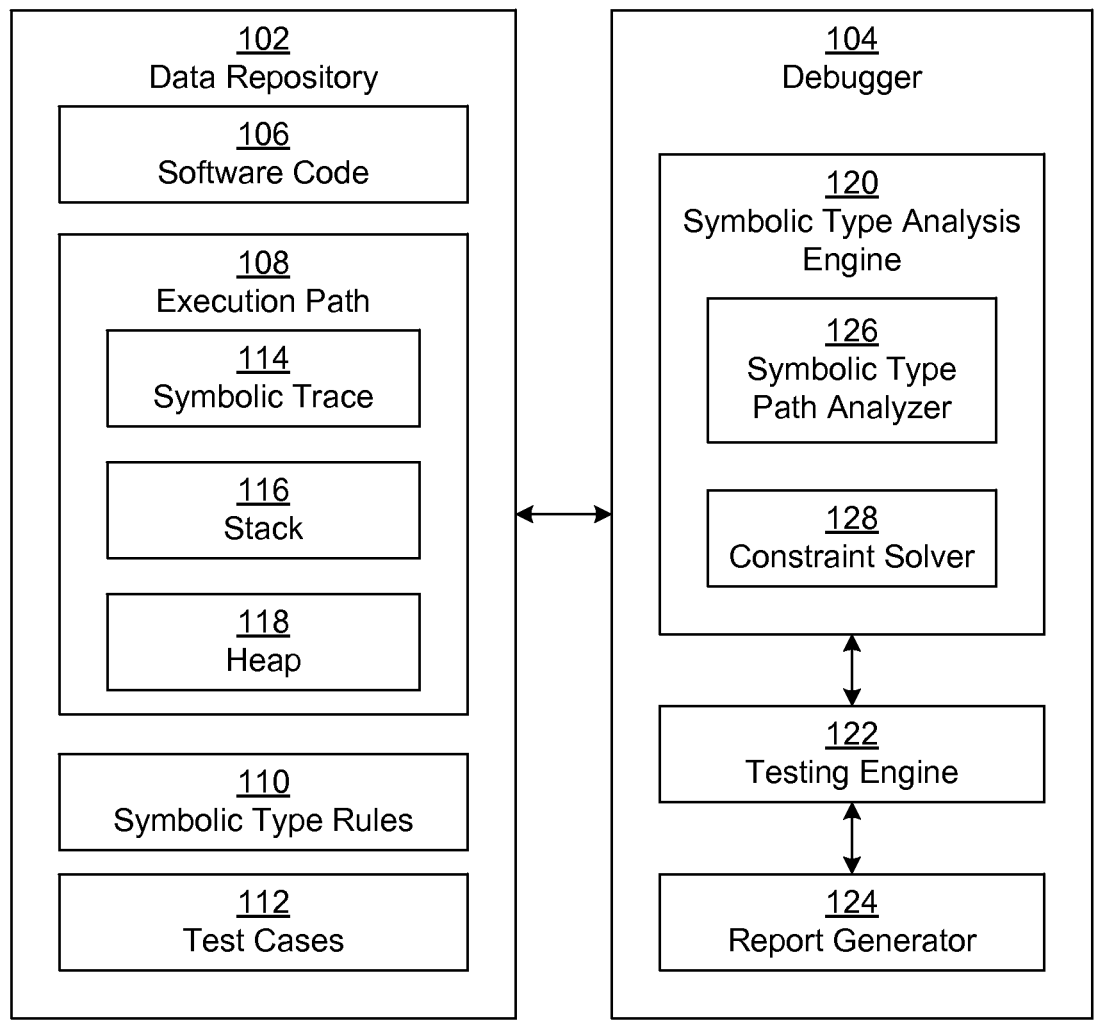
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed the second element in an ordering of elements.

In general, embodiments of the invention perform object oriented symbolic testing of software code. In the object oriented software testing, not only are the values of the objects, but also the types of the objects are represented using symbols. As used in this application, an object is an instance of a class, whereby the object may be one or more variables, one or more methods, one or more data structure, or a combination thereof. A type of the object is the class of which the object is an instance. A symbol is a placeholder for the actual (i.e., concrete) value or type. An object has an undefined class when the class of which the object is an instance is not expressly defined in the software code.

In one or more embodiments of the invention, rather than the actual value of the object and the actual class of the object, symbols are used. For example, the value of the variable x may be symbolically represented using the value X, whereby X may be any value, and the type of the variable x may be symbolically represented using the value T, whereby T may be any type (i.e., represent an instance of any class).

One or more embodiments of the invention use the symbols to identify or enumerate execution paths through software code. As the execution path is identified, symbolic type constraints and symbolic value constraints are added to the execution path. If the symbolic type constraints and the symbolic value constraints are capable of being satisfied (i.e., are consistent), then the execution path is deemed feasible. If either or both the symbolic type constraints or the symbolic value constraints are not capable of being satisfied (i.e., are not consistent), then the execution path is deemed infeasible. In other words, the software code cannot take the particular execution path. Objects having a defined class may not be symbolically represented using symbolic types and may be represented using symbolic values, while objects having an undefined class are symbolically represented using symbolic types and symbolic values in accordance with one or more embodiments of the invention.

FIG. 1 shows a schematic diagram of a system in accordance with one or more embodiments of the invention. As shown in FIG. 1, the system includes a data repository (102) and a debugger (104) in accordance with one or more embodiments of the invention. Both of these components are described below.

In one or more embodiments of the invention, the data repository (102) is any type of storage unit and/or device (e.g., random access memory, flash memory, a file system, database, collection of tables, or any other storage mechanism) for temporarily or permanently storing data. Further, the data repository (102) may include multiple different storage units and/or devices. The multiple different storage units and/or devices may or may not be of the same type or located at the same physical site. The data repository includes functionality to store software code (106), one or more execution paths (108), symbolic test rules (110), and test cases (112).

Software code (106) corresponds to software instructions that are being tested in accordance with one or more embodiments of the invention. In one or more embodiments of the invention, software code (106) may be all or a portion of the software instructions in a code library. For example, the library may be a public interface that executes differently given different types of inputs from a software application. Specifically, the library may receive, as input, different types of objects, whereby the type of object that the library receives is not known when the library is developed and whereby the execution of the code in the library is dependent on the type of object received. Alternatively or additionally, the software code (106) may be all or a portion of the software instructions in an application. The software code may correspond to a file, a class, a method, a procedure, a set of lines of code, a set of files, set of methods, a set of classes, a set of procedures, or another portion or all of the software code being analyzed. Further, the software code (106) may be in any stage of the development process. For example, the software code (106) may be in the process of being developed, undergoing intermediate or final testing, being compiled, released, being patched after release, or at any other stage. Additionally, the software code (106) may be source code, binary code, an intermediate representation, machine code, in another representation, or any combination thereof.

In one or more embodiments of the invention, the software code (106) includes statements. Each statement may be all or a portion of line of code. In one or more embodiments of the invention, a statement includes one or more expressions. An expression includes an operation and at least one object on which the operation acts. For example, a statement may correspond to or include a primitive operation, a method invocation, a condition branch instruction, a cast expression, or another expression or combination of expressions.

In one or more embodiments of the invention, the software code (106) may include one or more execution path(s) (108). An execution path (108) is a path of instructions through the software code (106). Specifically, an execution path (108) is an ordering or series of the instructions in the software code according to the order in which the instructions may be executed. The execution path (108) may include a single instruction included more than once to indicate that the instruction may be executed more than once and other instruction(s) not executed at all. For example, instructions in a single method may be listed multiple times (e.g., each time that a call to the single method exists in the software code). By way of another example, two separate execution paths may exist for a conditional branch that has an if condition and an else condition, whereby, in one execution path, the instructions in the body of the if condition are listed and the instructions in body of the else condition are not listed while, in the other execution path, the instructions in the body of the else condition are listed and the instructions in body of the if condition are not listed. An execution path (108) may be feasible or infeasible. A feasible execution path is an execution path that has the potential or is possible to be executed when the software code is executed. An infeasible execution path is impossible to be executed. For example, consider the following series of instructions:
(instruction 1) if x<y,
(instruction 2) then x=y−3;
(instruction 3) if x>y,
(instruction 4) then y=2.

In the example, the following execution paths are feasible:
execution path (a): (instruction 1): x<y=false, (instruction 3) x>y=true, (instruction 4) y=2;
execution path (b): (instruction 1): x<y=false, (instruction 3) x>y=false; and
execution path (c): (instruction 1): x<y=true, (instruction 2) x=y−3; (instruction 3) x>y=true.

Further, in the example, the following execution path is infeasible:
execution path (d): (instruction 1): x<y=true, (instruction 2) x=y−3; (instruction 3) x>y=true, (instruction 4) y=2;

Specifically, in execution path (d), instruction (2) changes x to be equal to three less than y. Thus, x cannot be greater than y after instruction (2) is executed, thereby making execution path (d) infeasible.

By way of another example, consider the scenario in which object Obj has an undefined class and the following two classes are defined sedan class and pickup truck class, where neither the sedan class nor the pickup_truck class inherit from the other class. In the example, consider the following series of instructions:
(instruction 1) if Obj instanceof sedan;
(instruction 2) then Obj.open_trunk( );
(instruction 3) if Obj instanceof pickup_truck;
(instruction 4) then Obj.open_tailgate( ).

In the example, the following execution paths are feasible:
execution path (a): (instruction 1): Obj instanceof sedan=false, (instruction 3) Obj instanceof pickup_truck=true, (instruction 4) Obj.open_tailgate( );
execution path (b): (instruction 1): Obj instanceof sedan=false, (instruction 3) Obj instanceof pickup_truck=false; and
execution path (c): (instruction 1): Obj instanceof sedan=true, (instruction 2) Obj.open_trunk( ); (instruction 3) Obj instanceof pickup_truck=false;

Further, in the example, the following execution path is infeasible:
execution path (d): (instruction 1) Obj instanceof sedan=true; (instruction 2) Obj.open_trunk( ); (instruction 3) Obj instanceof pickup_truck=true; (instruction 4) Obj.open_tailgate( ).

Specifically, in execution path (d), the object Obj is an instance of sedan class in instruction (1) and an instance of pickup_truck in instruction (3), but, because the sedan class and the pickup_truck class do not inherit from one to the other, the Obj cannot be both an instance of the sedan class and an instance of the pickup_truck class. Thus, the symbolic type constraints on object Obj of execution path (d) are inconsistent making execution path (d) infeasible. One or more embodiments of the invention enumerate each of the above execution paths using a symbolic type for the object and then determine which execution paths are feasible and which execution paths are infeasible.

In one or more embodiments of the invention, the execution path(s) (108) in the data repository (102) are generated or identified by the debugger (104) (discussed below). As part of generating the execution path (108), the execution path (108) includes a symbolic trace (114), a stack (116), and a heap (118). The symbolic trace (114) is an ordered listing of the sequence of instructions in the execution path (108). The symbolic trace includes an identifier of the instruction (i.e., the instruction itself or a unique identifier of the instruction), the symbolic values and symbolic types that are used by or result from the instruction, and path conditions for the execution path. The stack (116) is a data structure that stores information about the active methods of the software code and is used to generate the symbolic trace (114). The stack (116) may be referred to as an execution stack, a control stack, a run-time stack, or a machine stack. In some embodiments, rather than being used during execution, the stack is a data structure that is used during analysis of the software code. Thus, for at least some of the objects, the stack may store symbols rather than actual values and type information.

In other words, the execution path is identified by determining the sequence of instructions that would be executed. For each method invocation in the sequence, a new frame is added to the stack (116). The frame stores information about parameters, local variables, context, and other information about each invoked method that is being analyzed. When the symbolic trace through the method corresponding to the active frame completes, the frame is removed from the stack. For example, consider the scenario in which the software code includes method A, which includes a call to method B and method C, method B includes a call to method D, and method D includes a call to method C. In the example, to create the symbolic trace (114), the stack may be updated as follows: a frame for method A is added, a frame for method B is added, a frame for method D is added, a frame for method C is added (corresponding to the call from method D), the frame for method C is removed, the frame for method D is removed, the frame for method B is removed, the frame for method C is added (corresponding to the method call from A), the frame for method C is removed, and the frame for method A is removed.

In one or more embodiments of the invention, the heap (118) corresponds to a data structure representing the pool of memory that would be allocated to the software code (106) when the software code is executed. Specifically, the heap (118) corresponds to a storage for heap objects and corresponding fields that would be placed in memory during execution of the software code. Similar to the stack (116), the heap (118) is used to generate the symbolic trace (114) and represents the heap that is created during execution.

Continuing with the data repository (102), in one or more embodiments of the invention, symbolic type rules (110) correspond to a set of rules that translate statements to symbolic type constraints. A symbolic type constraint is a constraint on a symbolic type. In particular, a symbolic type constraint translates a statement in the software code to a limit on the possible types that an object may be. For example, an instance of rule may translate an instance of expression having a target class to a symbolic type constraint that the undefined class of an object is the target class in an instance of expression or extends the target class in the instance of expression. The target class is the class that is called in the expression. By way of another example, a cast rule may translate a cast expression having a target class to a symbolic type constraint that the undefined class of an object is the target class in a cast expression or extends the target class in the cast expression. By way of another example, an invoke rule may translate a method call expression, or invoke expression, as constraining the class of the object to one of the target classes implementing the method or extending one of the target classes having the method. The use of words instance of, cast, and invoke is intended to include equivalent operations in all object oriented programming languages. Such equivalent operations may be exactly equivalent or be one or more variation operations that are similar to the corresponding aforementioned operation in Java® programming language. Java® is a registered trademark of Oracle America, Inc., located in Redwood Shores, Calif.

In one or more embodiments of the invention, a test case is a set of concrete or actual values that is input to the software code for testing. Specifically, a test case corresponds to an example set of input for execution by the software code. In other words, the software code may be executed using the test case. Thus, whereas the symbolic trace is created by analyzing the instructions of the software code and includes symbols, the test case corresponds to actual values that are provided as input to the software code, does not include symbols, and is used to generate, by the software code, actual results or show defects of the software code. Although only a single test case is shown in FIG. 1, the data repository may include a test set that includes multiple test cases. The multiple test cases may correspond to inputs for executing different feasible execution paths.

In one or more embodiments of the invention, symbolic type rules may further include rules to manage symbolic types when the software code uses reflection instructions, and, thereby, support reflection calls. In general, reflection is a mechanism by which the software code may examine and modify the behavior of the software code at runtime. Supporting reflection calls may include adding additional tracking information, tracking additional objects, and/or additional type constraints. In one or more embodiments of the invention, the symbolic type analysis engine (discussed below) may use the symbolic type rules, including the symbolic type rules for reflection, to analyze the software code.

For example, a for name reflection call returns a new class object that has the provided string name. If the software code includes a for name reflection call, the symbolic type rules includes a rule that associates the returned class object that is created with a new symbolic type. In other words, a symbolic type rule may identify the for name reflection call as the creation of a new object for which symbolic type analysis should be performed. By way of another example, the get declared method reflective call returns an array of method objects that reflect the methods declared by the class object. The symbolic type rule for the get declared method reflective call may associate the class object with the method signature to represent the symbolic type of the class object. By way of another example, the get declaring class reflective call returns a class object of a class in which a method was declared. The symbolic type rule for the get declaring class may associate the returned class object with a new symbolic type. In one or more embodiments of the invention, the above are only a few examples of how reflection may be supported by the symbolic type rules. Other example techniques may be used without departing from the scope of the invention.

Continuing with FIG. 1, a debugger (104) is hardware, software, firmware or a combination thereof that includes functionality to identify defects in software code (104). A defect is a bug in the software code. For example, a defect may be caused by an error in the instructions of the software code, an unrecognized requirement of the software code, such as an omission of a requirement, that is an unintentional negative consequence of executing the software code. For example, a defect may be a memory leak, be slower execution, incorrect results, crashing the software code. In one or more embodiments of the invention, the debugger (104) includes a symbolic type analysis engine (120), a testing engine (122), and a report generator (124).

The symbolic type analysis engine (120) includes functionality to analyze the software code (106) using symbolic types and symbolic values, identify feasible and infeasible execution paths, and generate test cases (112). The symbolic type analysis engine (120) includes a symbolic type path analyzer (126) and a constraint solver (128). The symbolic type path analyzer (126) includes functionality to analyze the software code (106) and generate one or more execution paths (108) using symbolic types and symbolic values. Specifically, the symbolic type path analyzer (126) includes functionality to obtain, for instructions in the software code (106), the corresponding symbolic type rule(s) (110) that apply to the instruction, and update the execution path (108) based on the corresponding symbolic type rule(s). The execution path (108) from the symbolic type path analyzer includes symbolic type constraints and/or non-symbolic type constraints. The symbolic type path analyzer (126) further includes functionality to generate additional possible executions paths based on path constraints in the execution path.

In one or more embodiments of the invention, a path constraint is a requirement on the execution path for the execution path to be executed. Specifically, path constraints may be constraints defined by conditional branch instructions in the execution path. A path constraint may include one or more symbolic type constraints and/or one or more non-symbolic type constraints, such as symbolic value constraints.

In one or more embodiments of the invention, the combination of symbolic type constraints that not in the conditional branch instruction and path constraints on a path form the path condition. The path condition includes the combination of the constraints on the execution path that must be satisfied for the execution path to be feasible. The path condition includes a path constraint corresponding to the branch in the execution path for each conditional branch instruction along the execution path and a symbolic type constraint for each possible class of which an object may be.

In one or more embodiments of the invention, the constraint solver (128) includes functionality to determine whether an execution path is feasible based on the path constraints. Further, the constraint solver (128) includes functionality to generate one or more test cases for the feasible execution path(s).

Continuing with the debugger (104), the testing engine (122) includes functionality to track the execution of the software code (106) with the test cases (112) to generate results. For example, the testing engine (122) may provide, as input to the software code (106), a test case, and may trace the execution of the software code using the test case. As part of tracing the execution of the software code, the testing engine (122) may include functionality to identify which instructions in the software code were executed (e.g., the coverage of the test), the values of variables during the execution, identify defect(s), if existing, based on the execution using the test case, gather metrics (e.g., execution speed, etc), other debugging information, or a combination thereof.

The report generator (124) includes functionality to generate one or more reports based on the debugging. The report generator (124) may further include functionality to present the report to a reviewer, developer or other user of the debugging tool, such as by sending the report or displaying the report. A report may include a listing of the symbolic trace for feasible and/or infeasible execution paths, the test case(s) (112), debugging information gathered while tracing the execution of the software code, other information, or a combination thereof. Further, the report may be static or dynamic. For example, the user may select particular portions of the report to view additional information and/or perform additional debugging analysis on the software code.

While FIG. 1 shows a configuration of components, other configurations may be used without departing from the scope of the invention. For example, various components may be combined to create a single component. As another example, the functionality performed by a single component may be performed by two or more components. For example, all or a part of the symbolic type rules (110) may be a part of the symbolic type analysis engine (120) and/or the symbolic type path analyzer (126). Specifically, all or part of the symbolic type rules (110) may be encoded as software instructions in the symbolic type analysis engine (120). Alternatively or additionally, the symbolic type rules (110) may be separate from the symbolic type analysis engine (120). Further, the connections between the various components in FIG. 1 may be direct or indirect connections. For example, the symbolic type analysis engine (120) may load data into the data repository (102) and the data may be retrieved by the testing engine (122) without a specific call from the symbolic type analysis engine (120) to the testing engine (122).

FIGS. 2-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2:
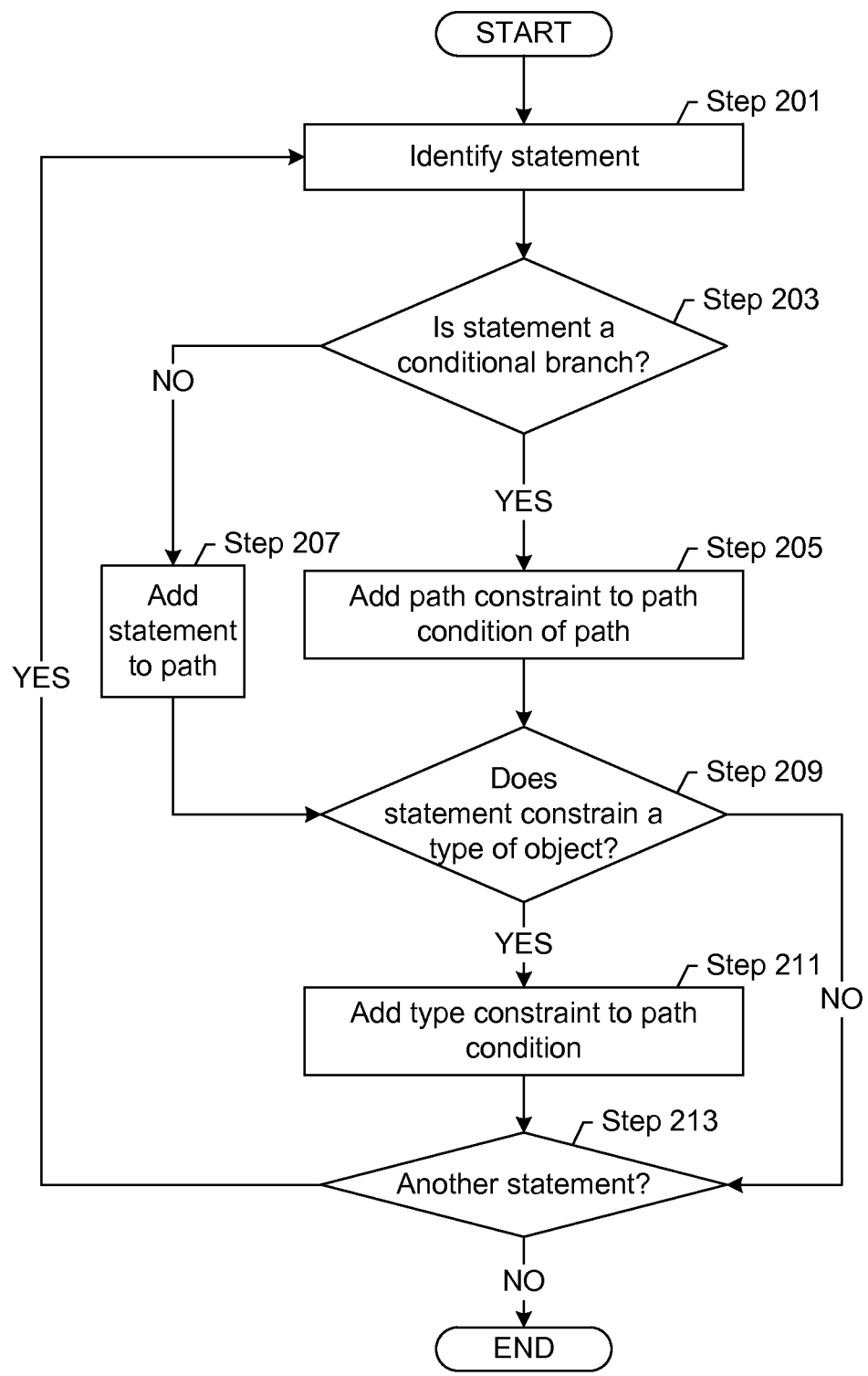
FIGS. 2, 3, 4, and 5 show flowcharts in accordance with one or more embodiments of the invention.

FIG. 2 shows a flowchart for enumerating one or more execution path(s) using symbolic types in accordance with one or more embodiments of the invention. In Step 201, a statement is identified in accordance with one or more embodiments of the invention. In one or more embodiments of the invention, statements are identified in an order in which the statements would be executed. If the software code corresponds to an application, then the initial statement identified is the initial statement in the main method. If the software code corresponds to a library, than the initial statement identified is the initial statement of a class in the library that may be called by another program. Similarly, the next statement, and so on, is determined as the next statement that would be executed in the order of the execution. In one or more embodiments of the invention, as discussed above, a statement may correspond to all or part of an instruction. For example, "x=x+Obj.getIntValue( )" may be deemed to have two statements: "Obj.getIntValue( )=result" and "x=x+result". In the example, "Obj.getIntValue( )=result" is identified and analyzed prior to "x=x+result" in accordance with one or more embodiments of the invention. Alternatively or additionally, the entire instruction may be identified and analyzed at the same time.

In Step 203, a determination is made whether the statement is a conditional branch instruction in accordance with one or more embodiments of the invention. As discussed above, a conditional branch instruction is an instruction in which execution may proceed along different branches based on the outcome of a condition in the conditional branch instruction. For example, a conditional branch instruction may be an if-condition, else condition, loop instruction, switch statement, or other branch instruction, etc. Determining whether a statement is a conditional branch instruction may be performed by comparing the statement with the syntax grammar of the language in which the statement is written. The syntax grammar is captured in the symbolic type rules. For example, in many languages, an if-statement follows the following grammar: "if (*)", where * is the condition for the if-statement. In the example, a symbolic type rule exists that maps a statement having the form, "if (*)", to the updates for the stack, heap, and/or symbolic trace based on the statement.

In one or more embodiments of the invention, if the statement is a conditional branch instruction, a path constraint is added to the path condition for the path in Step 205. Specifically, the symbolic type rule matching the conditional branch instruction adds the path constraint defined in the condition to the execution path. More specifically, the symbolic trace may be updated with the path constraint. In some embodiments, during a first symbolic analysis of the software code, the conditions in the conditional branch instructions are added as path constraints by creating a path constraint requiring that the condition is evaluated to true in order to generate a single execution path. After the first symbolic analysis, the path conditions are mutated to generate additional execution paths. In alternative or additional embodiments, multiple paths may be generated when the conditional branch is first evaluated by setting one path to true and the other path to false. Other techniques for handling conditional branch instructions may be performed without departing from the scope of the invention.

In one or more embodiments of the invention, updating the symbolic trace includes adding the symbolic values and/or symbolic types to the symbolic trace rather than the exact condition. For example, if value of x is represented as X and the condition is "x>2", then "X>2=true" is added to the symbolic trace as a path condition for the path in accordance with one or more embodiments of the invention. As another example, if the statement is an if condition requiring that the object is an instance of a particular class, the constraint that the object is an instance of the particular class is evaluated to true added to the symbolic trace as a path condition for the path.

Alternatively, if the statement is not a conditional branch instruction, then the statement is added to the path in Step 207. Adding the statement to the path may include updating the symbolic trace, the stack, and the heap. For example, the symbolic trace may be updated to include an identifier of the statement. The stack and/or the heap may be updated to reflect the changes performed by the statement. For example, if the statement is a method invocation, a new frame may be added to the stack. If the statement is an update to a variable or object of the program, then the symbolic values for the variable or object are updated based on the statement. The update may be performed by using the symbolic type rules. Specifically, as discussed above, the symbolic type rule corresponding to the statement is identified based on the syntax grammar in the symbolic type rule matching the statement. The symbolic type rule defines how to update the symbolic trace, the stack, and/or the heap based on the statement.

In Step 209, a determination is made whether the statement constrains the type of an object in accordance with one or more embodiments of the invention. A statement is considered to constrain the type of object when the object has an undefined class and the statement limits the class in which the object may be an instance. The determination may be performed using symbolic type rules in accordance with one or more embodiments of the invention.

In one or more embodiments of the invention, if the statement constrains the type of the object, then the type constraint is added to the path condition in Step 211. Adding the type constraint to the path condition may be performed by obtaining the symbol corresponding to the class of the object and updating the symbol to include the additional type constraint for the object. Specifically, the symbol may be obtained from the heap and the stack and the symbolic trace may be updated with the symbolic type constraint using the symbol. Performing Step 211 is discussed in further detail below and in FIG. 4 in accordance with one or more embodiments of the invention. Alternative or additional steps for performing Step 211 that are not included in FIG. 4 may be performed without departing from the scope of the invention. In one or more embodiments of the invention, if the execution proceeds along a certain path, where the class of the object is undefined and, thus, multiple possible paths exist, then a path constraint is added that the selected path must be taken. For example, in a method invocation on an object having an undefined class, the path constraint is that the method invocation must call the selected method in the selected class.

In one or more embodiments of the invention, the above analysis is performed according to the symbolic type rules. Specifically, the symbolic type rule matching the statement being analyzed may be applied to the statement to update tracking information in the symbolic trace, stack, and heap. In other words, for each statement in which a matching symbolic type rule is found, the symbolic type rule is applied to the statement to update the tracking information and, possibly, add symbolic constraints and path conditions. In one or more embodiments of the invention, the analysis is performed by the symbolic type path analyzer.

In Step 213, a determination is made whether another statement exists in accordance with one or more embodiments of the invention. If another statement exists that is not analyzed, then the next statement is identified in Step 201 in accordance with one or more embodiments of the invention.

Figure 3:
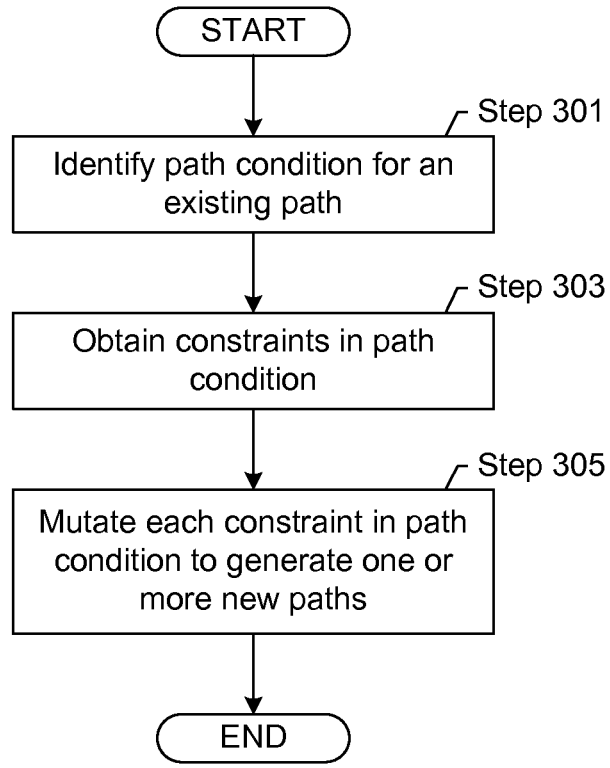

FIG. 3 shows a flowchart for generating additional paths in accordance with one or more embodiments of the invention. In Step 301, a path condition for an existing path is identified in accordance with one or more embodiments of the invention. As discussed above, the path condition includes the constraints on the execution path in order for the execution path to be performed. In Step 303, constraints in the path condition are identified in accordance with one or more embodiments of the invention.

In Step 305, each constraint in the path condition is mutated to generate one or more new paths in accordance with one or more embodiments of the invention. For path constraints, mutating the path condition may be performed by changing a path constraint to evaluate to false rather than true and determining the new execution path based on the path constraint being equal to false. Determining the new execution path may be performed by copying the existing execution path up to the statement in which the constraint is added and performing FIG. 2 for instructions after the statement in which the constraint was added. For example, for nested if statements, if the outer path constraint is evaluated to false, then the inner instructions including the inner nested path constraints would not be executed and, thus, are not added to the new execution path(s). For if statements in series, if the first constraint is evaluated to false, the following if statements would be executed and, thus, may be set to true or false in the new execution paths.

For method invocations on objects belonging to an undefined class, the mutating of the path constraint corresponds to performing the method invocation on the various methods in the different possible classes. Specifically, for the first path, the symbolic type constraint is that the target call function must be function f as in the concrete execution. To mutate the constraint, the constraint changes to the target call function must not be f, and the constraint is solved to generate a set of solutions to call different targets. When the constraint is solved, the original symbolic type constraint that the method invocation is to the method in the target class or invokes a class that inherits from the target class and implements the method remains. For example, consider the scenario in which a class drwObj exists that has a method obj.Draw(win) for drawing the object in window win. A circle class extends the drawObj class and implements the Draw(win) method for drawing a circle. A rectangle class extends the drawObj class and implements the Draw(win) method for drawing a rectangle. Consider further the scenario that an object having an undefined class calls Draw(win). For at least one execution path, the draw method in Circle class is called and the instructions in the Circle class are added to the execution path. To mutate the execution path, the constraint solver may be invoked to generate a new solution to the call target. The constraint solver may create a solution whereby the call target is the draw method in Rectangle class and the instructions in the Rectangle class are added to the execution path. Thus, the mutating allows for the obtaining of the different possible execution paths.

Figure 4:
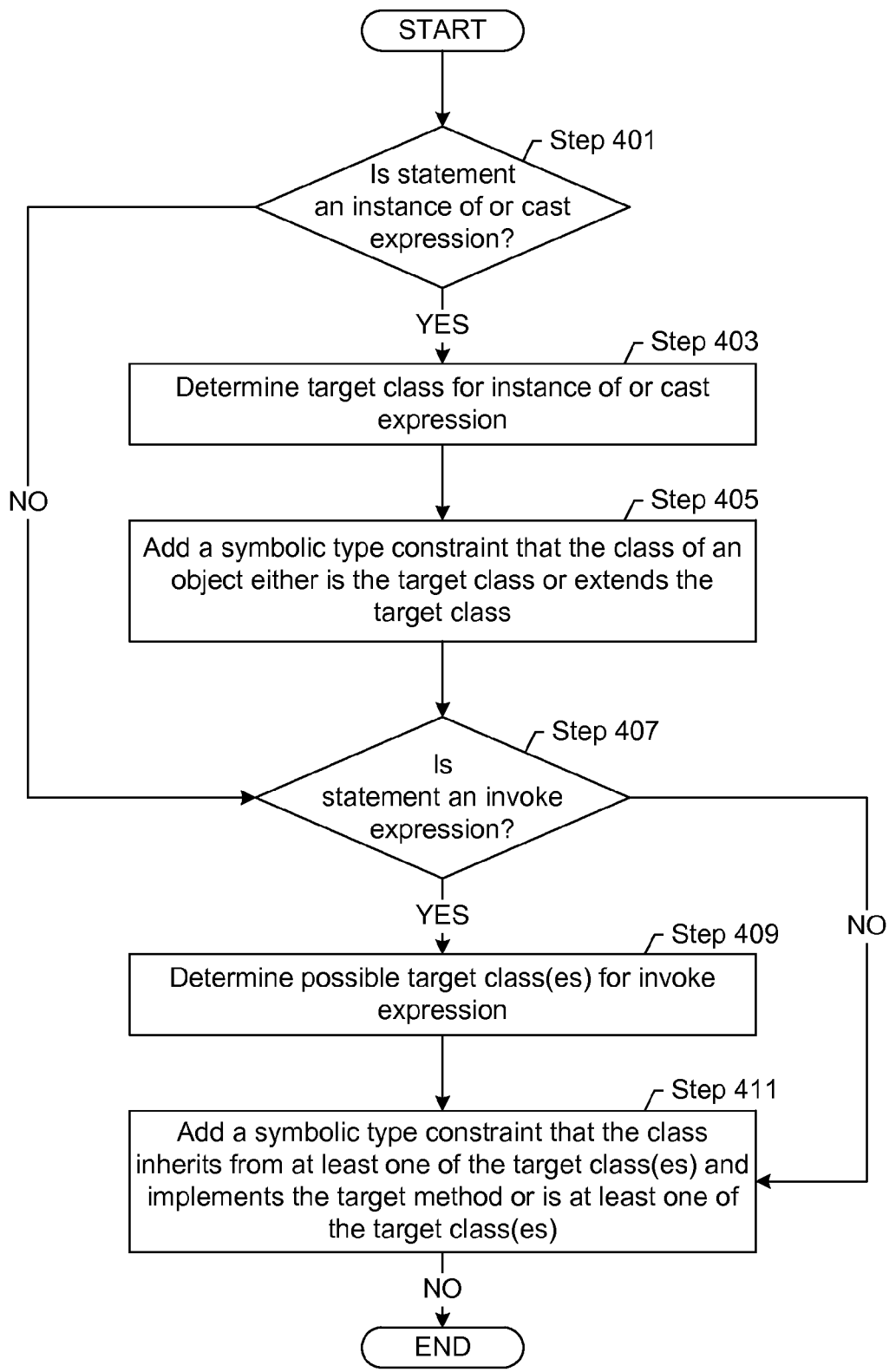

FIG. 4 shows a flowchart for adding type constraints to a path condition based on a statement in accordance with one or more embodiments of the invention. In Step 401, a determination is made whether the statement is an instance of or cast expression. Determining whether the statement is an instance of or cast expression may be performed by determining whether the statement matches the syntax grammar of the programming language in which the software code is written for instance of or cast expression. If the statement matches the syntax grammar required, then the statement is either an instance of or cast expression. In one or more embodiments of the invention, the determination may be performed by determining whether a symbolic type rule for an instance of or cast expression matches the statement.

In Step 403, the target class for the instance of or cast expression is determined in accordance with one or more embodiments of the invention. For instance of and cast expressions, the target class is the class expressly listed in the statement. Identifying the target class may be performed by comparing the statement with the syntax grammar for the instance of operator or cast operator. For example, in Java® programming language, the target class is the class after the instance of operator. Thus, determining the target class in Java® programming language includes extracting the target class from the position after the instanceof operator. A similar technique may be performed to identify the target class in the cast expression.

In Step 405, a symbolic type constraint is added that requires that the class of the object is either the target class or extends the target class. In other words, in one or more embodiments, the class of the object must either be the target class or inherit from the target class in order for the statement to be true. In one or more embodiments of the invention, adding the symbolic type constraint may include updating the stack and the symbolic trace to include the symbolic type constraint.

Continuing with FIG. 4, in Step 407, a determination is made whether the statement is an invoke expression in accordance with one or more embodiments of the invention. Determining whether the statement is an invoke expression may be performed in a same or similar manner to determining whether the statement is an instance of or cast expression. Specifically, by comparing the statement with the symbolic grammar of the programming language for invoke expressions, a determination may be made whether the statement satisfies the requirements of the symbolic grammar.

In Step 409, possible target class(es) for the invoke expression are identified in accordance with one or more embodiments of the invention. For invoke expressions, the possible target classes are the classes that implement the method called in the invoke expression. In one or more embodiments of the invention, the software code is analyzed to identify possible target classes of the invoke expression.

In Step 411, a symbolic type constraint is added that the class inherits from at least one of the target class(es) and implements the target method or is at least one of the target class(es). Adding the symbolic type constraint may be performed as discussed above with reference to Step 405.

Figure 5:
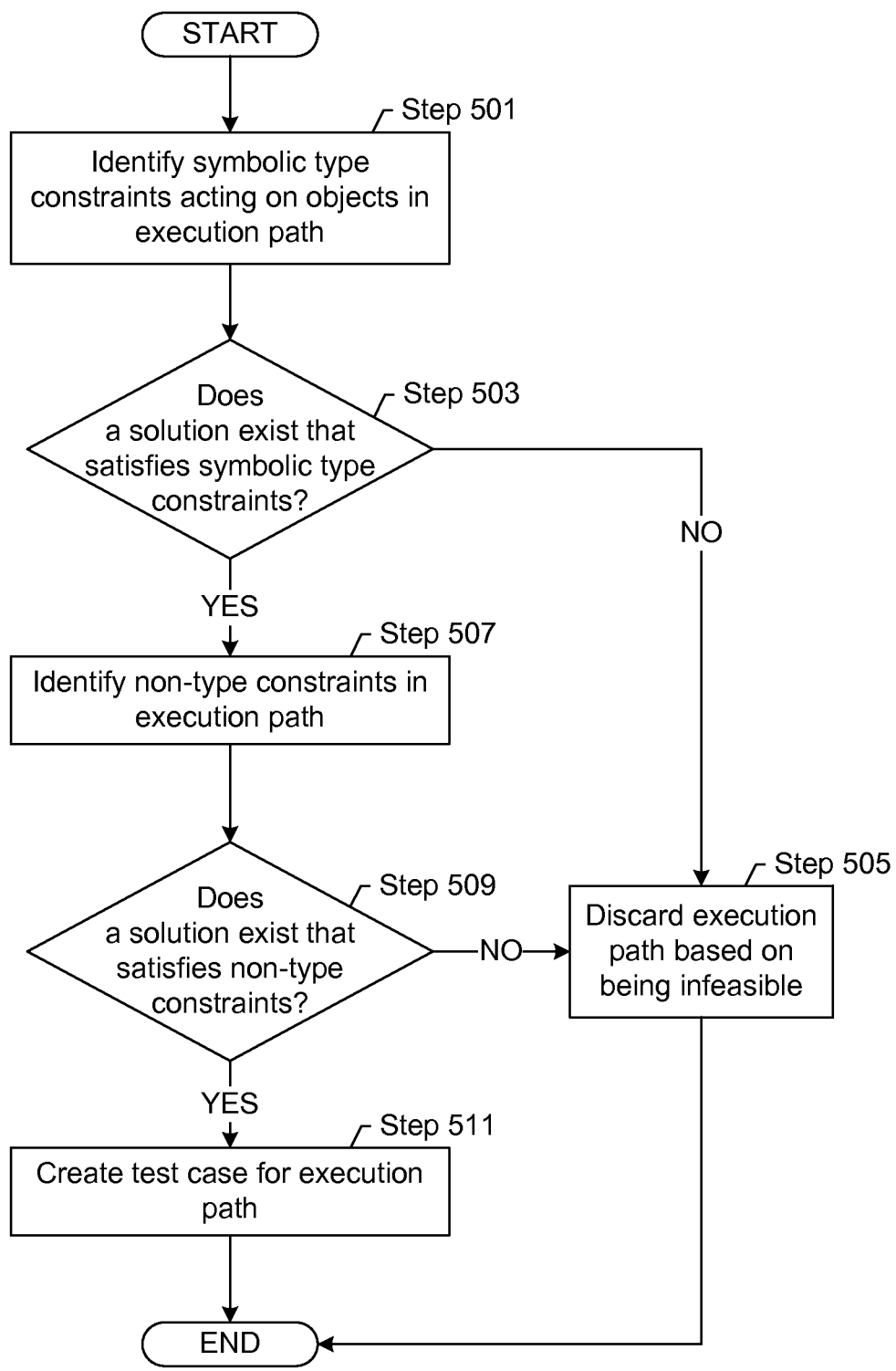

In one or more embodiments of the invention, after an execution path is enumerated, a determination may be made whether the execution path is feasible. FIG. 5 shows a flowchart for determining whether an execution path is feasible in accordance with one or more embodiments of the invention. In Step 501, symbolic type constraints acting on the objects in the path are identified in accordance with one or more embodiments of the invention. The symbolic type constraints may be obtained, for example, from the symbolic trace.

In Step 503, a determination is made whether a solution exists that satisfies the symbolic type constraints in accordance with one or more embodiments of the invention. Specifically, for each object having an undefined class, a determination is made whether a class exists that satisfies each of the symbolic type constraints constraining the class of the object. In accordance with one or more embodiments of the invention, if any of the objects do not have a class that satisfies all of the symbolic type constraints, then a solution does not exist.

In Step 505, if a solution does not exist, then the execution path is discarded based on being infeasible in accordance with one or more embodiments of the invention. Discarding the execution path based on being infeasible may include associating an infeasible identifier, such as a Boolean value, with the execution path, listing the execution path in an infeasible list, ignoring the execution path when creating a test case, deleting the execution path, performing another operation to indicate that the execution path is infeasible, or performing a combination thereof.

Returning to Step 503, if each object has at least one corresponding class that satisfies the symbolic type constraints, then a solution is deemed to exist. In Step 507, non-type constraints are identified in the execution path. The non-type constraints may include the symbolic value constraints. The non-type constraints as identified based on being the remaining constraints in the symbolic trace in accordance with one or more embodiments of the invention.

In Step 509, a determination is made whether a solution exists that satisfies the non-type constraints in accordance with one or more embodiments of the invention. A solution exists for non-type constraints when each variable has a corresponding starting value that satisfies each of the non-type constraints that reference the variable. If any variable does not have a corresponding starting value, then a solution does not exist and the execution path is set as infeasible in Step 505.

If a solution does exist, then at least one test case is created for the execution path in Step 511. Creating a test case is performed based on any solutions identified that satisfy the execution path. Specifically, a test case is created with concrete values that satisfy the solution. For symbolic types, a separate test case may be created for each of the classes that satisfy the symbolic type constraints in accordance with one or more embodiments of the invention. Alternatively, a single test case may be created for the entire execution path.

In one or more embodiments of the invention, the created test case may be temporarily or permanently stored in the data repository. Further, in accordance with one or more embodiments of the invention, the created test case may be used by the testing engine to test the software code with concrete values. In particular, the software code may be executed with the test case and the execution monitored by the testing engine. Further, the testing engine may generate a report based on monitoring the execution of the software code using the test case.

The following example is for explanatory purposes only and not intended to limit the scope of the invention. By way of an example, consider the scenario in which the following classes are defined. A car class extends (i.e., inherits from) an object class. Each of a sedan class, sport utility vehicle class, and truck class extends the car class. Each of a compact sedan class, mid-size sedan class, and full-size sedan class extend the sedan class. Both a two door sport utility vehicle class and a four sport utility vehicle sedan class extend the sport utility vehicle class. Each of a pickup truck class, a flatbed truck class, and a box truck class extend the truck class.

In the example, the software code includes an object having an undefined class, a cast expression on the object, an instance of expression on the object, and a method invocation on the object. The cast expression casts the object as a car. The instance of expression is in a conditional branch instruction that the object is an instance of sedan class in order for the condition to evaluate to true. The invoke expression is in the body of another conditional branch statement. The invoke expression calls a method that is defined only in the mid-size sedan class and the full-size sedan class. One or more embodiments of the invention enumerate the various execution paths.

When encountering the above various statements in the different execution paths, the following symbolic type constraints are added to the path condition. Based on a cast rule, the cast expression that casts the object as a car is translated to a symbolic type constraint requiring that the type of the object is an instance of a car class or a class that extends the car class (e.g., sedan class, sport utility vehicle class, truck class, compact sedan class, mid-size sedan class, full-size sedan class, two door sport utility vehicle class, a four sport utility vehicle sedan class, pickup truck class, flatbed truck class, a box truck class). Based on an instance of rule, the conditional branch having an instance of with sedan class when true is interpreted to require that the object is an instance of a sedan class or a class that inherits from the sedan class (e.g., compact sedan class, mid-size sedan class, full-size sedan class). Based on an invoke rule, the object calling the method that is defined only in the mid-size sedan class and the full-size sedan class is interpreted to require that the object is an instance of the mid-size sedan class or the full-size sedan class.

Path constraints based on the path selected are also added to the path condition to enumerate the various execution paths. For example, for one execution path, the path constraint that is added the object is the instance of the mid-size sedan class. When the path is mutated, the path constraint is added that the object is an instance of the full-size sedan class.

The debugger enumerates the various execution paths through the software code using the symbolic types in one or more embodiments of the invention. Some of the execution paths are feasible and some of the execution paths are infeasible. A constraint solver determines which execution paths are feasible and which execution paths are infeasible. If the above three example statements exist in an execution path of the software code being debugged, then the execution path may satisfy the constraints if the object is a mid-size sedan or a full-size sedan. Thus, the execution path is deemed feasible. Thus, at least one test case may be created whereby the object is a mid-size sedan and at least another test case may be created whereby the object is a full-size sedan to determine how the software code actually executes.

In contrast, if a second execution path is defined that includes the first example statement, the second example statement (i.e., conditional branch) as not true, and the third example statement above, then no class exists for the object that satisfies all three constraints because both the mid-size sedan and the full-size sedan inherit from the sedan class. Thus, the second execution path is infeasible and the debugger may ignore the execution path.

As shown by way of the example, one or more embodiments of the invention are able to enumerate the possible execution paths using symbolic types rather than just symbolic values. Thus, the feasible execution paths may be enumerated for software libraries and interfaces even when the software library or interface includes objects having an undefined class. By being able to enumerate the feasible execution paths, test cases that apply to each of the different execution paths may be defined, thereby, increasing code coverage during testing in one or more embodiments of the invention. In one or more embodiments of the invention, by increasing code coverage, more defects may be uncovered and corrected to increase the quality of the software code.

The following is an example of symbolic type rules that may be used in accordance with one or more embodiments of the invention. Additional or alternative symbolic type rules may be used without departing from the scope of the invention. In the example, the symbols and variables used below are the same throughout the example.

In one or more embodiments of the invention, to support symbolic types, method signatures are introduced to symbolic value execution to reason about method implementations. The method signature domain may follow the following syntactic grammar, where M is the method and $C_1, \ldots, C_n$ are classes.

Signature:={$\mathcal{M}(C_1, \ldots, C_n)$}

Objects may have concrete values or symbolic values. The syntactic grammar may be updated to include the following definitions for concrete value (ConcreteVal) and symbolic value (SymbolicVal).

ConcreteVal:=CONST|Obj|C|C|C⊖Signature

SymbolicVal:=ConcreteVal|SymConstraint|SymNum|SymType|SymType⊖Signature

In the above definition, the concrete value may be a constant (CONST), an object (Obj), a class (C), or a C⊙Signature, where C⊙ is a declaration in class C of the method with a signature (Signature). Further, the symbolic value may be a concrete value, a symbolic constraint (SymConstraint), such as a symbolic type constraint or a symbolic value constraint, a symbolic number (SymNum), a symbolic type (SymType), or SymType⊙Signature, where SymType⊙ is a declaration in the class represented by the SymType of the method with a signature (Signature).

Further, the following semantic function $[\![\cdot]\!]_{st}$ for primary expressions may be defined as follows.

$$[\![e]\!]_{st} = \begin{cases} car(st)(\mathcal{V}) & \text{if } e \text{ is a variable } \mathcal{V} \text{ and } car(st)(\mathcal{V}) \text{ is defined,} \\ (CONST, \text{``}CONST\text{''}) & \text{if } e \text{ is a constant } CONST \end{cases}$$

For instanceof, the following symbolic type rule may be defined.

$$(symtr, st, hp) \xrightarrow{S:\ \mathcal{V}=\mathcal{V}'\ instanceof\ C;} (symtr', st', hp), \text{ where}$$

$(Obj, Obj) = [\![\mathcal{V}']\!]_{st}$, $(C', \text{``}symtype''\text{''}) = hp((Obj, \text{TYPE})), symtr' = cons((\mathcal{S}, \text{true}), symtr),$ $st' = cons(car(st)[\mathcal{V} \mapsto (C' \trianglelefteq C, \text{``}symtype \trianglelefteq C''\text{''})], st),$ In the above rule, the execution path is represented as a tuple having a symbolic trace (symtr), a stack (st), and a heap (hp). S is the statement. Further, a "'" refers to the item before the "'" as an updated version or possibly a different reference. For example, symtr' is symtr updated. As another example, V' may be possibly a different reference than V. An object is represented as (Obj, Obj) where the first Obj is for the type and the second Obj is for the value. The C⊴C' means that class C is C' or (possibly transitively) extends C'. Cons is construct list, Car is the first item in the list, Cdr is the rest of the list. Thus, symtr'=cons((S, true), symtr) means that the list of the symbolic trace is updated to include the statement S being evaluated to true. As shown above, a lookup of the symbolic type of V' is performed and introduced as the symbolic type constraint on the symbolic representation of the result. A conditional branch that depends on V will introduce type constraints accordingly.

For cast, the following symbolic type rule may be defined to handle referential downcasting.

$$(symtr, st, hp) \xrightarrow{S:\ \mathcal{V}=C(e);} (symtr', st', hp), \text{ where}$$

$(Obj, Obj) = [\![e]\!]_{st}$, $addr = (Obj, \text{TYPE})$, $(C', \text{``}symtype''\text{''}) = hp(addr), C' \trianglelefteq C,$ and $symtr' = cons((\mathcal{S}, \text{``}symtype \trianglelefteq C''\text{''}), symtr),$ For method invocations, the following symbolic type rule may be defined.

$$(symtr, st, hp) \xRightarrow{S:\ \sigma} (symtr', st', hp), \text{ where}$$

$\sigma = \mathcal{V}.\mathcal{M}(e_1, \ldots, e_n);, m = lookup(\sigma),$ $$st' = cons\left(\bigcup_{i=1}^{n}(formal(m)_i \mapsto [\![e_i]\!]_{st}), st\right),$$

-continued $(Obj, Obj) = [\![\mathcal{V}]\!]_{st}$, $addr = (Obj, \text{TYPE})$, $(C, \text{``}symtype'\text{''}) = hp(addr), C \trianglelefteq C', \text{implements}(C', m),$ and $symtr' =$ $cons((\mathcal{S}, \text{``}inheritsMethod(symtype, m), symtype \odot m = C' \cdot m''\text{''}), symtr)$ In one or more embodiments of the invention, the symbolic type constraints are applied to reflection. Software code may use reflection to introspect the properties of the object-oriented software programs itself. Below is an example for handling reflection in the Java® programming language.

To handle the reflection application programming interface, the possible input types are related to the reflective invocation target method. In Java® programming language's reflection API, a class and a method are respectively heap objects of java.lang.Class and java.lang.reflect.Method classes, whose properties (fields) cannot be modified. Thus, the symbolic execution state discussed in the previous example does not need to be changed to support reflection. For the following example, the same symbols are used as the previous example. Specifically, a class is identified using the identifier C, and a method is identified by the declaration of the method by the method's declaration (e.g., C⊙m for m∈Signature. A class heap object is represented using the pair (C, "symtype") with symtype∈SymType, while a method object is represented using the pair (C⊙m; "symtype⊙m") with symtype∈SymType and m∈Signature.

For class literals, the class information is stored onto a frame in the stack. The type of a class is predetermined to be java.lang.Class such that the class information may not be stored on the heap. The following is an example rule for storing the class information on the stack.

$$(symtr, st, hp) \xrightarrow{S:\ \mathcal{V}=C.class;} (symtr', st', hp), \text{ where}$$

$st' = cons(car(st)[\mathcal{V} \mapsto (C, \_)], st),$ and $symtr' = cons((\mathcal{S}, \text{``true''}), symtr)$ In Java® programming language, other than using .class field, a class may also be obtained using getClass( ) method of java.lang.Object class. The following three symbolic type rules may be defined. The first rule below is when getClass( ) is invoked on ordinary instance that is not a class. The second rule below is for when getClass( ) is invoked on an instance that is a class. The type of a class is java.lang.Class. The third rule below is for when getClass( ) is invoked on an instance that is a method, whose class is java.lang.reflect.Method.

First Rule:

$$(symtr, st, hp) \xrightarrow{S:\ \mathcal{V}.getClass();} (symtr', st', hp), \text{ where}$$

$(Obj, Obj) = [\![\mathcal{V}]\!]_{st}$, $(C, \text{``}symtype''\text{''}) = hp((Obj, \text{TYPE})),$ $st' = cons(car(st)[callee.ret \mapsto (C, \text{``}symtype''\text{''})], st),$ and $symtr' = cons((\mathcal{S}, \text{``true''}, symtr)$ Second Rule:

$$(symtr, st, hp) \xRightarrow{S:\ \mathcal{V}.getClass();} (symtr', st', hp), \text{ where}$$

$(C, \_) = [\![\mathcal{V}]\!]_{st}$, $st' = \text{cons}(\text{car}(st)[callee.ret \mapsto (\text{java.lang.Class}, \text{"java.lang.Class"})], st)$, and $symtr' = \text{cons}((\mathcal{S}, \text{"true"}), symtr)$ Third Rule:

$$(symtr, st, hp) \xRightarrow{S:\ \mathcal{V}.getClass();} (symtr', st', hp), \text{ where}$$

$(C \odot m, \text{"symtype} \odot m''\text{"}) = [\![\mathcal{V}]\!]_{st}$, $st' = \text{cons}(\text{car}(st)[callee.ret \mapsto$
$\quad (\text{java.lang.reflect.Method}, \text{"java.lang.reflect.Method"})], st)$, and $symtr' = \text{cons}((\mathcal{S}, \text{"true"}), symtr)$ In order to support the ForName reflective call, the following rule may be applied. Specifically, a usage of Class.for-Name( ) is by supplying the ForName call with a constant argument. Class.forName(C) returns the class identifier C. Therefore, the following rule may be used for the execution of the interface.

$$(symtr, st, hp) \xRightarrow{S:\ Class.forNamae(C);} (symtr', st', hp), \text{ where}$$

$st' = \text{cons}(\text{car}(st)[callee.ret \mapsto (C, \_)], st)$, and $symtr' = \text{cons}((\mathcal{S}, \text{"true"}), symtr)$ Another potential usage of the ForName method call is when ForName method call is provided with a reference to a java.lang.String object. The String object which represents a class name may be represented the same as a class. Thus, the following symbolic type rule may be defined.

$$(symtr, st, hp) \xRightarrow{S:\ Class.forNamae(\mathcal{V});} (symtr', st', hp), \text{ where}$$

$(C, \text{"symtype"}) = [\![\mathcal{V}]\!]_{st}$, $st' = \text{cons}(\text{car}(st)[callee.ret \mapsto (C, \text{"symtype"})], st)$, and $symtr' = \text{cons}((\mathcal{S}, \text{"true"}), symtr)$ Continuing with the example, the Class.newInstance( ) method call creates a new object of the corresponding type. The following symbolic type rule may be defined for when the provided reference V in the call refers to a class. The symbolic type rule may be a restriction that the new instances created cannot be java.lang.class or java.lang.reflect.method.

$$(symtr, st, hp) \xRightarrow{S:\ \mathcal{V}.newInstance();} (symtr', st', hp'), \text{ where}$$

$(C, \text{"symtype"}) = [\![\mathcal{V}]\!]_{st}$,

Obj is the created heap object not referenced in either $st$ or $hp$, $st' = \text{cons}(\text{car}(st)[callee.ret \mapsto (Obj, Obj)], st)$, $hp' =$
$\quad hp \cup \{addr \mapsto \text{default} | addr = (Obj, \mathcal{F}), \mathcal{F} \in \text{fields}(C), \mathcal{F} \neq \text{TYPE}\} \cup$
$\quad\quad \{(Obj, \text{TYPE}) \mapsto (C, \text{"symtype"})\}$, and $symtr' = \text{cons}((\mathcal{S}, \text{"symtype} \notin$
$\quad \{\text{java.lang.Class, java.lang.reflect.Method}\}''), symtr)$ The Class.getDeclaredMethod(m) returns a reflective representation of method with signature m declared in the class. The following symbolic type rule may be defined for getDeclaredMethod(m) method call.

$$(symtr, st, hp) \xRightarrow{S:\ \mathcal{V}.getDeclaredMethod(m)} (symtr', st', hp'), \text{ where}$$

$st' = \text{cons}(\text{car}(st)[callee.ret \mapsto (C \odot m, \text{"symtype} \odot m''\text{"})], st)$, $\quad (C, \text{"symtype"}) = [\![\mathcal{V}]\!]_{st}$, and $symtr' = \text{cons}((\mathcal{S}, \text{"true"}), symtr)$ Java® programming language's Method.getDeclaringClass( ) method returns the declaring class of a given method object. The following symbolic type rule may be defined for Method.getDeclaringClass( ) method call.

$$(symtr, st, hp) \xRightarrow{S:\ \mathcal{V}.getDeclareingClass();} (symtr', st', hp), \text{ where}$$

$(C_m \odot m, \text{"symtype}_m \odot m''\text{"}) = [\![\mathcal{V}]\!]_{st}$, $st' = \text{cons}(\text{car}(st)[callee.ret \mapsto (C_m, \text{"symtype}_m''\text{"})], st)$, and $symtr' = \text{cons}((\mathcal{S}, \text{"true"}), symtr)$ The Method.invoke( ) method call invokes the method represented by the reflective object. To handle the Method.invoke( ) method call, a lookup is performed on the method that is represented, then invoke the method. The following symbolic type rule may be defined to handle the Method.invoke( ) method call.

$$(symtr, st, hp) \xRightarrow{S:\ \mathcal{V}.invoke(e_0, e_1, \ldots, e_n);} (symtr', st', hp), \text{ where}$$

$(C_m \odot m, \text{"symtype}_m \odot m''\text{"}) = [\![\mathcal{V}]\!]_{st}$, $$st' = \text{cons}\left(\bigcup_{i=1}^{n} (\text{formal}(m)_i \mapsto [\![e_i]\!]_{st}), st\right),$$

$(Obj, Obj) = [\![e_0]\!]_{st}, addr = (Obj, \text{TYPE})$, $(C, \text{"symtype"}) = hp(addr), C \leq C', \text{implements}(C', m)$, and $symtr' = \text{cons}((\mathcal{S}, \text{"symtype} \leq symtype_m,$
$\quad \text{inheritsMethod}(symtype, m), symtype \odot m = C' \cdot m''\text{"}), symtr)$ The following symbolic type rule may be applied to the invocation of a method of java.lang.Class.

$$(symtr, st, hp) \xRightarrow{S:\ \mathcal{V}.invoke(e_0, e_1, \ldots, e_n);} (symtr', st', hp), \text{ where}$$

$(\text{java.lang.Class} \odot m, \text{java.lang.Class} \odot m) = [\![\mathcal{V}]\!]_{st}$, $$st' = \text{cons}\left(\bigcup_{i=1}^{n}(\text{formal}(m)_i \mapsto [\![e_i]\!]_{st}), st\right),$$

$(C, \_) = [\![e_0]\!]_{st}$, *inheritsMethod*(java.lang.Class, $m$), and $symtr' = \text{cons}((\mathcal{S}, \text{"true"}), symtr)$ In one or more embodiments of the invention, instead of actually symbolically executing the method code of the methods of java.lang.Class or java.lang.Object which the method code extends, the special cases for when m is .class, .getClass( ), forName( ), newInstance( ) or getDeclaredMethod( ) may be considered as follows. For example, when m in the above rule is getDeclaredMethod(m') for some m'∈Signature, the following rule may be applied to summarizes the successful execution of the method.

$(symtr, st, hp) \xRightarrow{S: \mathcal{V}.invoke(e_0, m);} (symtr', st', hp)$, where $(\text{java.lang.Class} \odot m', \text{java.lang.Class} \odot m') = [\![\mathcal{V}]\!]_{st}$, $m' = getDeclaredMethod(\text{java.lang.Object}, \text{java.lang.Class}[\,])$, $(C, \text{"symtype"}) = [\![e_0]\!]_{st}$, $st' = \text{cons}(\text{car}(st)[callee.ret \mapsto (C \odot m, \text{"symtype"} \odot m'')], st)$, and $symtr' = \text{cons}((\mathcal{S}, \text{"true"}), symtr)$ The symbolic execution rules for instanceof, casting, and invoke statement may be extended to take into account classes and methods when reflective calls are supported. The following rules may be applied to extend instanceof, casting, and invoke statements, respectively.

$(symtr, st, hp) \xRightarrow{S: \mathcal{V}=\mathcal{V}' \text{instanceof } C;} (symtr', st', hp)$, where $(C', \_) = [\![\mathcal{V}']\!]_{st}$, $st' = \text{cons}(\text{car}(st)[\mathcal{V} \mapsto (C = \text{java.lang.Class}, \text{"}C = \text{java.lang.Class"})], st)$, and $symtr' = \text{cons}((\mathcal{S}, \text{"true"}), symtr)$ $(symtr, st, hp) \xRightarrow{S: \mathcal{V}=C(e);} (symtr', st', hp)$, where $(C', \text{"symtype"}) = [\![e]\!]_{st}, C \in \{\text{java.lang.Object}, \text{java.lang.Class}\}$, $st' = \text{cons}(\text{car}(st)[\mathcal{V} \mapsto (C', \text{"symtype"})], cdr(st))$, and $symtr' = \text{cons}((\mathcal{S}, \text{"true"}), symtr)$ $(symtr, st, hp) \xRightarrow{S: \alpha} (symtr', st', hp)$, where $\sigma = \mathcal{V}.\mathcal{M}(e_1, \ldots, e_n);, m = \text{lookup}(\sigma)$, $(C, \text{"symtype"}) = [\![\mathcal{V}]\!]_{st}$, implements(java.lang.Class, $m$), $st' = \text{con}\left(\bigcup_{i=1}^{n}(\text{formal}(m)_i \mapsto [\![e_i]\!]_{st}), st\right)$, and $symtr' =$ $\text{cons}((\mathcal{S}, \text{"true"}), symtr)$ The following are rules may be applied to handle the cases for method objects.

Figure 6:
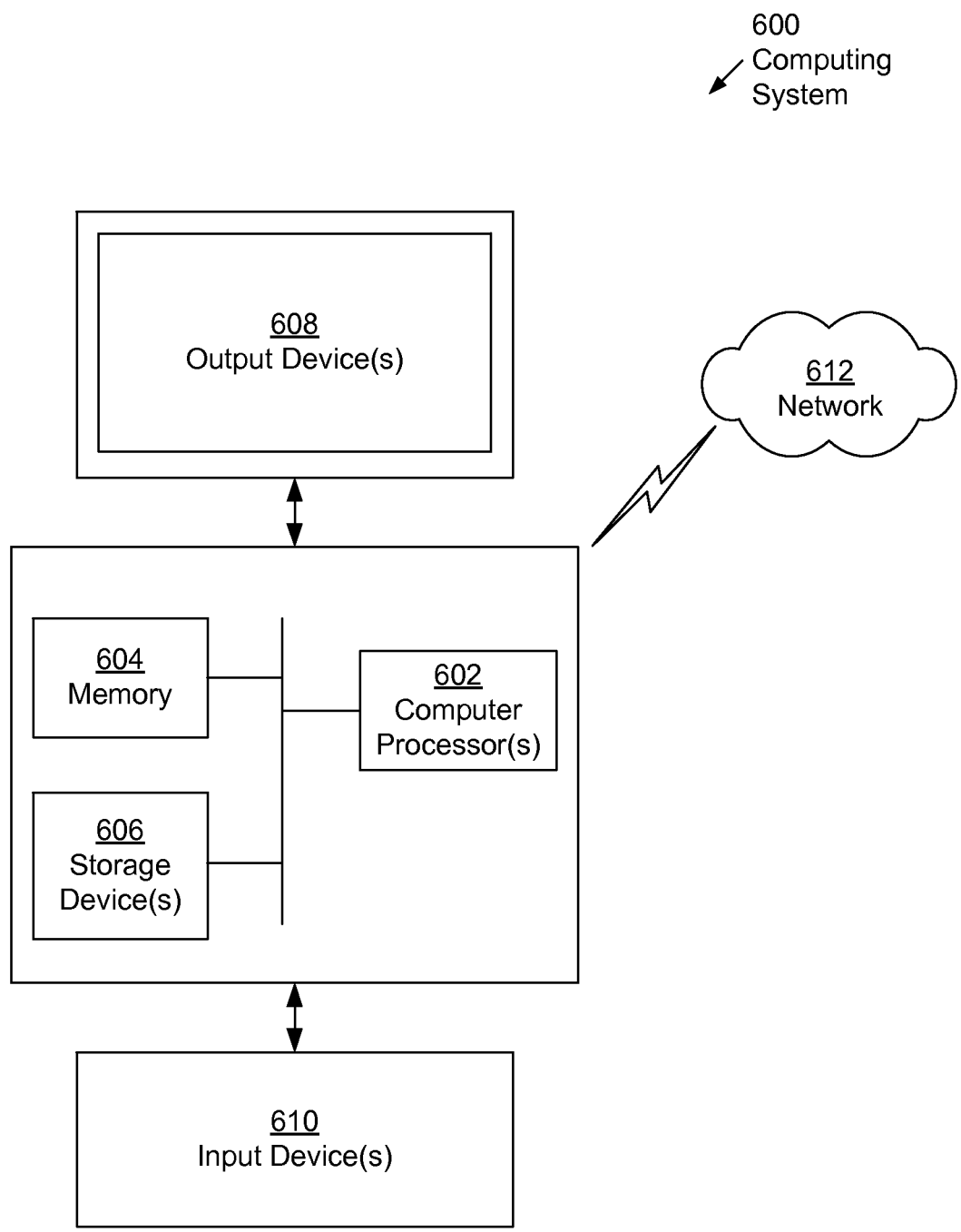
FIG. 6 shows a computing system in accordance with one or more embodiments of the invention.

$(symtr, st, hp) \xRightarrow{S: \mathcal{V}=\mathcal{V}' \text{instanceof } C;} (symtr', st', hp)$, where $(C \odot m, \_ \odot m) = [\![\mathcal{V}']\!]_{st}$, $st' = \text{cons}(\text{car}(st)[\mathcal{V} \mapsto (C = \text{java.lang.reflect.Method}, $ $\text{"}C = \text{java.lang.reflect.Method"})], st)$, and $symtr' = \text{cons}((\mathcal{S}, \text{"true"}), symtr)$ $(symtr, st, hp) \xRightarrow{S: \mathcal{V}=C(e);} (symtr', st', hp)$, where $(C \odot m, \text{"symtype"} \odot m'') = [\![e]\!]_n$, $C \in \{\text{java.lang.reflect.Method}, \text{java.lang.Object}\}$ $st' = \text{cons}(\text{car}(st)[\mathcal{V} \mapsto (C \odot m, \text{"symtype"} \odot m'')], cdr(st))$, and $symtr' = \text{cons}((\mathcal{S}, \text{"true"}), symtr)$, and $(symtr, st, hp) \xRightarrow{S: \alpha;} (symtr', st', hp)$, where $\sigma = \mathcal{V}.\mathcal{M}(e_1, \ldots, e_n);, m = \text{lookup}(\sigma), (C \odot m, \text{"symtype"} \odot m'') = [\![\mathcal{V}]\!]_{st}$, implements(java.lang.Method, $m$), $st' = \text{con}\left(\bigcup_{i=1}^{n}(\text{formal}(m)_i \mapsto [\![e_i]\!]_{st}), st\right)$, and $symtr' =$ $\text{cons}((\mathcal{S}, \text{"true"}), symtr)$ Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (614) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (614). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for object-oriented programming code analysis, comprising:
   generating, by a computer processor, a first execution path through software code, the first execution path comprising a first path condition, the first path condition comprising a plurality of symbolic type constraints on the first execution path, wherein generating the first execution path comprises:
      obtaining a symbol representing any of a plurality of possible types of an object having an undefined class;
      updating the symbol for the object with a first symbolic type constraint which adds the first symbolic type constraint to the first path condition of the first execution path based on a first statement in the first execution path; and
      updating the symbol for the object with a second symbolic type constraint which adds the second symbolic type constraint to the first path condition of the first execution path based on a second statement in the first execution path;
   making, by the computer processor, a first determination that the first path condition of the first execution path is infeasible based on determining that a class does not exist that satisfies the first symbolic type constraint of the object and the second symbolic type constraint of the object;
   discarding the first execution path based on the first determination;
   generating a second execution path through the software code, the second execution path comprising a second path condition, the second path condition comprising a plurality of symbolic type constraints on the second execution path, wherein generating the second execution path comprises:
      updating the symbol for the object with a third symbolic type constraint which adds the third symbolic type constraint to the second path condition of the second execution path based on a first statement in the second execution path; and
      updating the symbol for the object with a fourth symbolic type constraint which adds the fourth symbolic type constraint to the second path condition of the second execution path based on a second statement in the second execution path;
   making a second determination that the second path condition of the second execution path is feasible based on, at least in part, determining that a class does exist that satisfies the third symbolic type constraint and the fourth symbolic type constraint; and
   generating a test case based on the second determination.

2. The method of claim 1, further comprising:
   determining that the second statement in the second execution path is a conditional branch statement in the second execution path;
   generating the second execution path in response to the conditional branch statement.

3. The method of claim 2, wherein the conditional branch statement comprises an instance of expression comprising a target class, and wherein, based on the instance of expression, the second symbolic type constraint specifies that the undefined class of the object is one selected from the target class and extends the target class.

4. The method of claim 1, wherein the first statement of the first execution path is the same as the first statement of the second execution path.

5. The method of claim 1, wherein the second statement in the first execution path is a cast expression comprising a target class, and wherein, based on the cast expression, the second symbolic type constraint specifies that the undefined class of the object is one selected from the target class and extends the target class.

6. The method of claim 1, wherein the second statement in the first execution path is an invoke expression comprising at least one target class, and wherein, based on the invoke expression, the second symbolic type constraint specifies that the undefined class of the object is one selected from a group consisting of a class that inherits from the at least one target class and at least one of the target classes.

7. A system for object-oriented programming code analysis comprising:
   a computer processor;
   a data repository for storing software code and a plurality of symbolic type rules; and
   a debugger executing on the computer processor and comprising:
      a symbolic type analysis engine comprising:
         a symbolic type path analyzer for: generating a first execution path through software code, the first execution path comprising a first path condition, the first path condition comprising a plurality of symbolic type constraints on the first execution path, wherein generating the first execution path comprises:
            obtaining a symbol representing any of a plurality of possible types of an object having an undefined class;
            updating the symbol for the object with a first symbolic type constraint which adds the first symbolic type constraint to the first path condition of the first execution path based on a first statement in the first execution path; and
            updating the symbol for the object with a second symbolic type constraint which adds the first symbolic type constraint to the first path condition of the first execution path based on a second statement in the first execution path; and generating a second execution path through the software code, the second execution path comprising a second path condition, the second path condition comprising a plurality of symbolic type constraints on the second execution path, wherein generating the second execution path comprises:

updating the symbol for the object with a third symbolic type constraint which adds the third symbolic type constraint to the second path condition of the second execution path based on a first statement in the second execution path; and updating the symbol for the object with a fourth symbolic type constraint which adds the fourth symbolic type constraint to the second path condition of the second execution path based on a second statement in the second execution path;

a constraint solver for:

making a first determination that the first path condition of the first execution path is infeasible based on determining that a class does not exist that satisfies the first symbolic type constraint of the object and with the second symbolic type constraint of the object;

discarding the first execution path based on the first determination;

making a second determination that the second path condition of the second execution path is feasible based on, at least in part, determining that a class does exist that satisfies the third symbolic type constraint and the fourth symbolic type constraint; and generating a test case based on the second determination.

8. The system of claim 7, further comprising:
a testing engine configured to track execution of the software code using the test case to obtain a result.

9. The system of claim 8, further comprising:
a report generator configured to generate a report using the result.

10. A non-transitory computer readable medium for object-oriented programming code analysis, comprising instructions for:

generating a first execution path through software code, the first execution path comprising a first path condition, the first path condition comprising a plurality of symbolic type constraints on the first execution path, wherein generating the first execution path comprises:

obtaining a symbol representing any of a plurality of possible types of an object having an undefined class;

updating the symbol for the object with a first symbolic type constraint which adds the first symbolic type constraint to the first path condition of the first execution path based on a first statement in the first execution path, and updating the symbol for the object with a second symbolic type constraint which adds the second symbolic type constraint to the first path condition of the first execution path based on a second statement in the first execution path;

making a first determination that the first path condition of the first execution path is infeasible based on determining that a class does not exist that satisfies the first symbolic type constraint of the object and the second symbolic type constraint of the object; and discarding the first execution path based on the first determination;

generating a second execution path through the software code, the second execution path comprising a second path condition, the second path condition comprising a plurality of symbolic type constraints on the second execution path, wherein generating the second execution path comprises:

updating the symbol for the object with a third symbolic type constraint which adds the third symbolic type constraint to the second path condition of the second execution path based on a first statement in the second execution path; and updating the symbol for the object with a fourth symbolic type constraint which adds the fourth symbolic type constraint to the second path condition of the second execution path based on a second statement in the second execution path;

making a second determination that the second path condition of the second execution path is feasible based on, at least in part, determining that a class does exist that satisfies the third symbolic type constraint and the fourth symbolic type constraint; and generating a test case based on the second determination.

11. The non-transitory computer readable medium of claim 10, further comprising instructions for:

determining that the second statement in the second execution path is a conditional branch statement in the second execution path;

generating the second execution path in response to the conditional branch statement.

12. The non-transitory computer readable medium of claim 11, wherein the conditional branch statement comprises an instance of expression comprising a target class, and wherein, based on the instance of expression, the second symbolic type constraint specifies that the undefined class of the object is one selected from the target class and extends the target class.

13. The non-transitory computer readable medium of claim 10, wherein the first statement of the first execution path is the same as the first statement of the second execution path.

14. The non-transitory computer readable medium of claim 10, wherein the second statement in the first execution path is a cast expression comprising a target class, and wherein, based on the cast expression, the second symbolic type constraint specifies that the undefined class of the object is one selected from the target class and extends the target class.

15. The non-transitory computer readable medium of claim 10, wherein the second statement in the first execution path is an invoke expression comprising at least one target class, and wherein, based on the invoke expression, the second symbolic type constraint specifies that the undefined class of the object is one selected from a group consisting of a class that inherits from the at least one target class and at least one of the target classes.

* * * * *